UNITED STATES PATENT OFFICE.

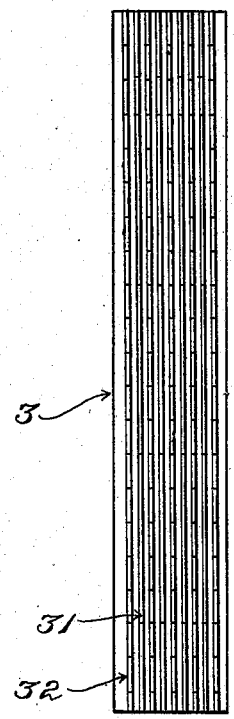

MICHAEL COLLINS, OF LOWELL, MASSACHUSETTS.

MACHINE FOR PREPARING FIBERS FOR SPINNING.

No. 866,918.            Specification of Letters Patent.          Patented Sept. 24, 1907.

Application filed January 16, 1907. Serial No. 352,501.

*To all whom it may concern:*

Be it known that I, MICHAEL COLLINS, a citizen of the United States, residing at Lowell, in the county of Middlesex, State of Massachusetts, have invented a certain new and useful Improvement in Machines for Preparing Fibers for Spinning, of which the following is a specification, reference being had therein to the accompanying drawings.

The invention consists in a licker-in of new and useful construction and character for use in machines for preparing, etc., cotton.

The invention has for its general object to attain improved results in preparing cotton fibers for spinning, cleaning the fibers, and drawing them to the cylinder of a carding engine or other preparing machine.

In conformity with the invention I have supplied the periphery of a rotating cylinder with wire-toothed clothing having the faces of the teeth formed to operate in part as cleaning teeth and to rake back from the surface of the cylinder, and in part as drawing or licker-in teeth and to rake forward, or to point straight from the surface of the cylinder, as preferred.

The licker-in embodying the invention is used in combination with the feeding devices, and cylinder, of a carding engine or other preparing machine.

In a machine constructed and arranged as in the accompanying drawing, the usual feed-roll advances the fibers to, and the face of the usual feed-plate supports them against, the teeth of the licker-in, which operate on the advancing fibers.

The cleaning teeth do not draw the fibers forward, but comb from them seed, leaf, motes, and other foreign or defective matter. They operate in combination with the drawing or licker-in teeth, which, after one revolution of the cylinder, follow in the path of the cleaning teeth, and, passing freely between the cleaned fibers, draw the latter, when separated from the feeding devices, to the cylinder.

In the drawings,—Figure 1 shows a section of a carding-engine with the invention applied thereto. Fig. 2 shows a licker-in embodying my invention. Figs. 3 and 4 are sectional detail views illustrating the different forms of toothed clothing which I apply to the licker-in in conformity with my invention.

Having reference to the drawings, in Fig. 1, the feeding-devices of a carding engine are indicated at 1, 2, the feed-plate being designated 1, and 2 being the feed-roll. At 3 is represented a licker-in. At 4 is represented a portion of the main cylinder. In this figure the working surfaces of the feed-roll 2, licker-in 3, and main cylinder 4 are indicated by dotted lines. At 5 is a straight-edge or mote-knife, it having the working edge thereof located in close proximity to the toothed surface of the licker-in. At 6 is represented the screen beneath the licker-in.

The foregoing parts are or may be constructed, combined, and arranged to operate as usual heretofore, or as preferred, and, save with respect to the teeth thereof, the licker-in is or may be constructed as heretofore or as preferred. Fig. 2 shows the body thereof formed with grooves extending spirally around its periphery, and with toothed wire wound in the spiral grooves, all as commonly the case in the construction of the like cylinders or rolls in practice. Certain of the said teeth have their faces formed in part to rake back from the surface of the cylinder, as at 32, and are arranged to comb from the fibers seed, leaf, motes, and other foreign and defective matters before they have passed from the feeding devices, and the others thereof have their faces formed to point as is usual with drawing or licker-in teeth straight from its surface, or to rake forward as at 31, and are arranged to draw the cleaned fibers, after they have passed from the feeding devices, to the main cylinder of a carding engine in the usual way.

The improved licker-in operates first to clean the fibers before they have passed from the feeding devices, and, after the cleaned fibers have passed from the feeding devices, to do the usual work of a licker-in by drawing them to the main cylinder of the carding engine.

I have herein described the invention more particularly with reference to the employment thereof at the entering end of the form of preparing machine known as a carding engine, but I wish it to be understood that the invention is not limited to use in a machine constructed precisely as indicated in the drawings, or in this particular form of preparing machine. Nor, do I limit myself to location of the invention at the feeding end of the machine, for my improved cylinder is equally adapted to be employed in some intermediate portion of the machine and the invention will be present so long as the same principles are involved, that is to say, so long as the cylinder, whatever it may be called, has the teeth formed as specified herein, and so long as it is employed to operate substantially as herein explained in connection with devices for gradually presenting the fibers to the action of the said cylinder.

I claim as my invention:—

1. In a machine for preparing fibers for spinning, a rotating licker-in cylinder furnished with saw-toothed clothing having the faces of the teeth formed in part to rake back from the surface of the cylinder.

2. In a machine for preparing fibers for spinning, a rotating licker-in cylinder furnished with teeth set so that the faces of the teeth point from the surface of the cylinder at different angles.

3. In a machine for preparing fibers for spinning, the combination with means for feeding or advancing fibers gradually and holding them while being acted upon by a succeeding cylinder until delivered up thereto, of the said cylinder furnished with saw-toothed clothing having the faces of the teeth formed in part to rake back from the surface of the cylinder.

In testimony whereof I affix my signature in presence of two witnesses.

MICHAEL COLLINS.

Witnesses:
CHAS. F. RANDALL,
EDITH J. ANDERSON.